Dec. 8, 1959 C. P. GINSBURG ET AL 2,916,547

RECORDING AND REPRODUCING SYSTEM

Filed May 5, 1955 4 Sheets-Sheet 1

INVENTORS
CHARLES P. GINSBURG
SHELBY F. HENDERSON, JR.
BY
ATTORNEYS

INVENTORS
CHARLES P. GINSBURG
SHELBY F. HENDERSON, JR.
BY
Flehr and Swain
ATTORNEYS INVENTORS
CHARLES P. GINSBURG
SHELBY F. HENDERSON, JR.
BY
Fletcher & Swain
ATTORNEYS Dec. 8, 1959 C. P. GINSBURG ET AL 2,916,547
RECORDING AND REPRODUCING SYSTEM
Filed May 5, 1955 4 Sheets-Sheet 4

INVENTORS
CHARLES P. GINSBURG
SHELBY F. HENDERSON, JR.
BY
Flehr and Swain
ATTORNEYS United States Patent Office 2,916,547

Patented Dec. 8, 1959

2,916,547

RECORDING AND REPRODUCING SYSTEM

Charles P. Ginsburg, Los Altos, and Shelby F. Henderson, Jr., Woodside, Calif., assignors to Ampex Corporation, Redwood City, Calif., a corporation of California Application May 5, 1955, Serial No. 506,182

6 Claims. (Cl. 178—6.6)

This invention relates generally to magnetic tape recording and/or reproducing systems and methods. In particular, it is adapted for use where the frequency spectrum involved extends over a wide range, as, for example, where visual images are being recorded and/or reproduced.

In copending application Serial No. 427,138, filed May 3, 1954, and entitled "Visual Image Recording and Reproducing System and Method," there is disclosed a system and apparatus involving the use of a rotatable recording and reproducing head. This head is provided with a plurality of magnetic units which sweep across the face of the magnetic tape as the latter is moved across the head. With a system of this type, it is important during reproduction to control the speed of the tape in conjunction with rotation of the head, to cause proper tracking of the magnetic units upon the recorded areas, and a relative speed between each unit and the recorded information which effects reproduction without distortion. It will be evident that such systems are critical with respect to synchronization and speed control, because of the relatively high speed with which the magnetic units are moved across the tape. Relatively minor deviations from synchronism or proper speed control result in distortions of the reproduced visual image.

In general it is an object of the present invention to provide a recording and/or reproducing system and method involving use of a rotary head, and which is capable of maintaining absolute synchronism with desired speed control.

Another object of the invention is to provide a system and method of the above character which will be an improvement with respect to the system and method disclosed in the above mentioned application Serial No. 427,138.

Another object of the invention is to provide an improved system and method for the recording and reproduction of visual images, which will serve to minimize distortions in the reproduced image such as may be attributed to lack of synchronism and speed control with respect to rotation of the head assembly and tape transport means.

Additional objects and features of the invention will appear from the following description in which the preferred embodiment has been set forth in detail in conjunction with the accompanying drawing.

Referring to the drawing.

Figure 1:
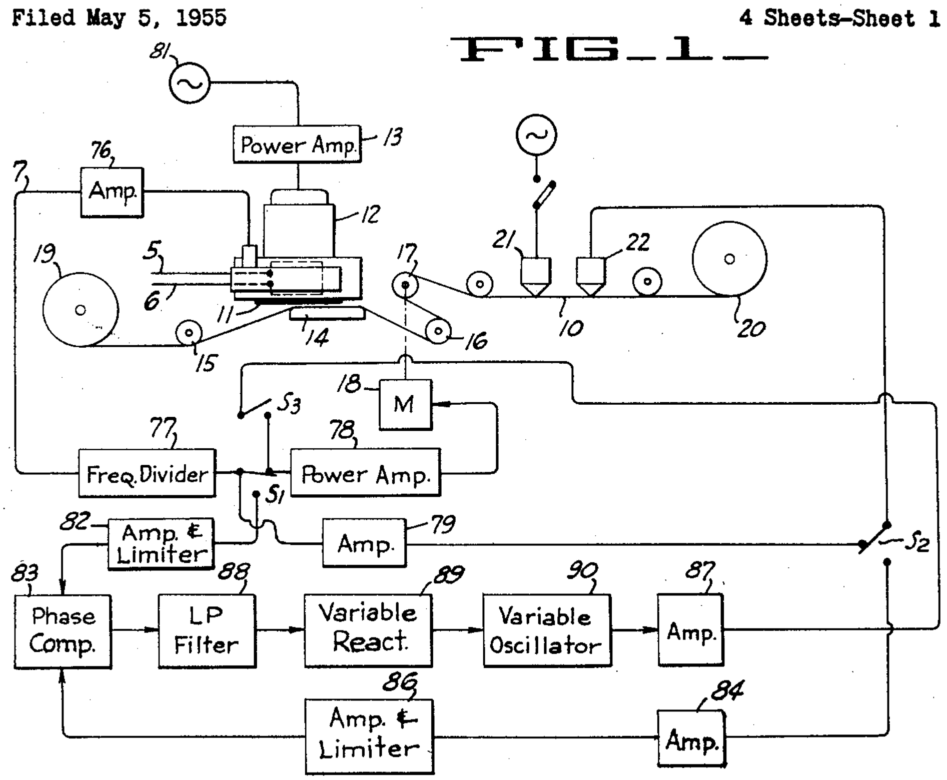
Figure 1 is a schematic view illustrating a complete system incorporating the present invention.

The system illustrated schematically in Figure 1 consists of a magnetic tape recording and/or reproducing apparatus, which employs the magnetic tape 10. Preferably, the tape is of substantial width, as, for example, a width of the order of 2 inches. Its construction can be similar to that commonly used for high fidelity recording of audio signals, namely, a thin film of pliable plastic material having a homogeneous magnetic coating upon the side of the same. Means are provided for moving the tape at a substantially constant speed past the rotary magnetic head 11. As will be presently explained, the magnetic head includes magnetic recording and/or reproducing units which successively sweep across the tape, as the head rotates. The speeds employed are such that the magnetic devices sweep across narrow track areas which are spaced a small amount in the direction of the length of the tape. The head assembly is driven by the motor 12 of the synchronous type which is energized from a source of alternating current, represented in this instance by the power amplifier 13.

As means for guiding the tape in cooperative relation with the rotating head 11, Figure 1 schematically illustrates a guide plate or platen 14, which is disposed adjacent to the head, together with the tape guide stud 15, the rolling guide 16, and the driving capstan 17. The capstan is driven by the electric motor 18 of the synchronous type, which in turn is supplied with alternating current by means to be presently described. The tape is wound upon the supply and takeup reels 19 and 20, which are carried by suitable turntables. Supplemental erase and record heads 21 and 22 are arranged to operate along one margin of the tape. The erase head 21 can be connected to a suitable high frequency oscillator as indicated, to erase previously recorded signals from the margin of the tape. The record head 22 is employed to record and/or reproduce a frequency used in conjunction with the speed control system.

One type of rotary head is shown in Figures 5–10, inclusive, and corresponds to the rotary head disclosed in the aforementioned copending application Serial No. 427,138. It is associated with pulse generating means whereby pulses are generated at a frequency corresponding precisely to the speed of rotation. The complete head assembly is shown mounted upon the panel 23, which likewise may serve to mount the various parts of the tape transport means. The electric motor 12 of the head assembly is fixed within the mounting 24, and has its shaft connected to drive the rotary head 11.

The rotary head includes the annular member 25, which has circumferentially spaced recesses 26 formed about its periphery. The recesses serve to accommodate magnetic units 27. Each of these units can be constructed in a manner similar to the magnetic record and/or playback heads used on conventional magnetic tape machines. More particularly each unit consists of a core of suitable magnetic material, such as ferrite, together with a winding having terminals adapted to connect with a pair of output terminals through commutating means. Each core is provided with magnetic pole tips 28, which are relatively narrow as measured in a radial direction, and which can be made of "mu" metal. There is a small gap between adjacent pole tips, occupied by an insert of non-magnetic material, and this gap extends in a plane coincident with the axis of rotation and perpendicular to the plane of the adjacent tape. All of the magnetic head units have their pole tips at the same radial distance from the axis of the rotation. The central hub 30 of member 25 is fixed by suitable means to the shaft 31 of the motor. As shown particularly in Figure 10, the pole tips 28 extend a short distance from the exterior face of member 25. Each unit can be embedded in a body of plastic material as illustrated. A retaining band or ring 29 is fixed upon the member 25, and serves to retain the units 27 within the recesses 26.

It is desirable to provide the contact face of the platen 14 with an arcuate groove 71 whereby the magnetic tape spans its recess as it is swept by the magnetic head units. The contact of each head unit with the tape should provide a substantially constant pressure for the entire sweep from one edge of the tape to the other. Likewise, the contact pressure for successive head units should be constant. In operation of the apparatus, care should be taken to maintain a substantially constant linear tension upon the tape.

Figure 9:
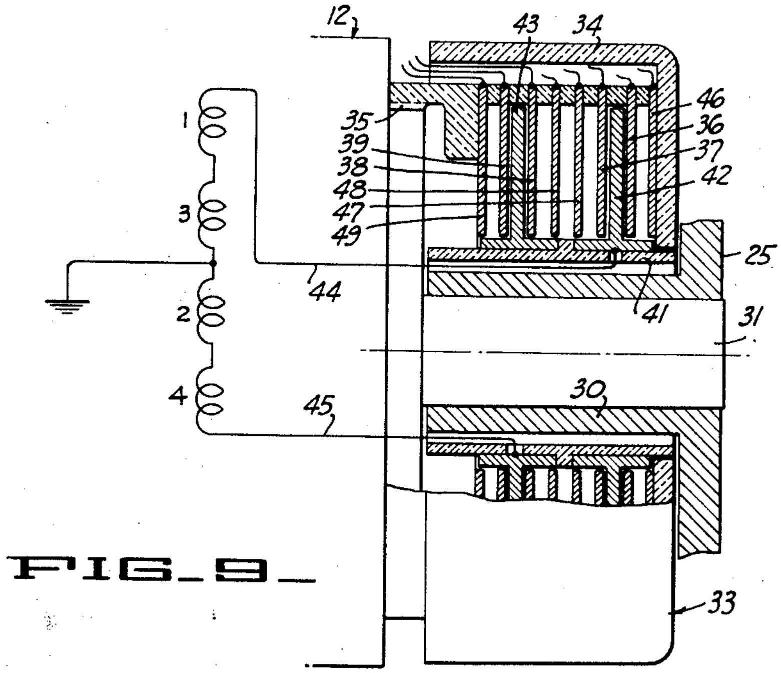
Figure 9 is a schematic view illustrating capacitive commutating means for coupling output leads to the magnetic units of the rotary head assembly.

The mounting 24 is shown supporting the annular housing 32, which generally surrounds the ring 29. This housing carries part of a pulse generating means, as will be presently described. A commutator assembly 33 occupies the space between the rotary member 25 and the adjacent end of the motor 12. As shown in Figure 9, the assembly 33 is of the capacitor type and consists of an outer shell 34, which can be made of suitable insulating material, and which has a threaded portion 35 for attachment to a stationary part of the motor 12. The interior of shell 34 serves to mount the annular metal members 36, 37, 38 and 39, which are spaced axially. A hub 41 forms an insulating mounting for the annular metal members 42 and 43. Member 42 is interposed between members 36 and 37, and member 43 interposed between members 38 and 39. The members 42 and 43 are adapted to be electrically connected by leads 44 and 45 to the several magnetic head units. Assuming that the head units are numbered 1, 2, 3 and 4, they can be serially connected in two groups as indicated in Figure 9. One group, consisting of heads 1 and 3, can have one terminal of head 1 connected to lead 44 and its other terminal connected to unit 3. The other terminal of unit 3 can connect to ground through the motor shaft. This connection can be capacitive but preferably is conductive. The annular members 36 and 37 are connected together and to the lead 5 of Figure 1. Members 38 and 39 are similarly connected together and to the lead 6.

Additional annular electrostatic shield members 46, 47, 48 and 49 can be provided. Members 47 and 48 are interposed between the members 37 and 38, and members 46 and 49 are disposed outside the members 36 and 39. The capacitive relationship between member 42 and the members 36 and 37 serve to transfer signal energy from lead 44 to the lead 5. Similarly, the capacitive relationship between member 43 and members 38 and 39 transfers signal energy from lead 45 to the lead 6. The electrostatic shield members can be grounded. In place of such a capacitive type of commutating means, we can use suitable slip rings and brush contactors.

Previous reference has been made to pulse generating means associated with the rotary head for generating pulses in synchronism with rotation. While various types of pulse generating means can be used, it is satisfactory to employ the photoelectric means illustrated particularly in Figures 5 to 8. It consists of a housing member 51 which is secured to the housing 32 and which is provided with a bore 52 to receive the photoelectric tube 53. This tube has a base 54 for attachment to housing member 51. Also, there is a bore 55 which serves to accommodate the mounting base 56 for the lamp 57 and the light focusing lens 58.

The outer periphery of the ring 29 is provided with darkened areas D1 and D2 and relatively reflective light areas L1 and L2. These light and dark areas are all of equal circumferential extent, and they have sharp lines of demarcation between them which extend parallel to the axis of the rotation. The light from the lamp 57 is focused by lens 58 on a relatively small point or narrow band on the periphery of ring 29, and the reflected light falls on the photoelectric tube 53.

Figure 3:
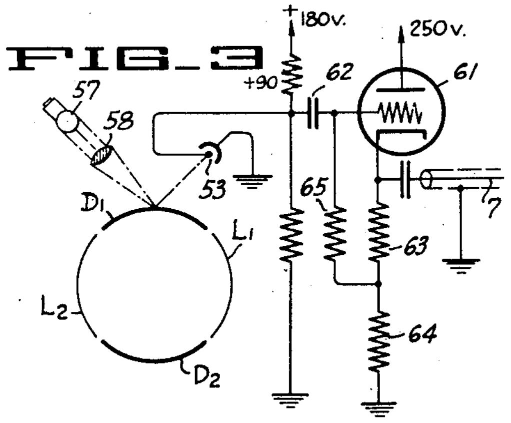
Figure 3 is a schematic view illustrating the pulse generating means and the cathode follower connected to the same.
Figure 4:
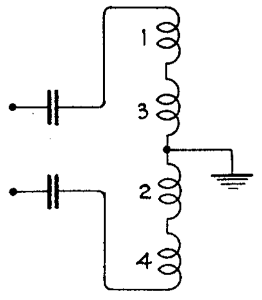
Figure 4 is a schematic circuit diagram illustrating the magnetic units of the rotary head assembly.
Figures 5, 6:
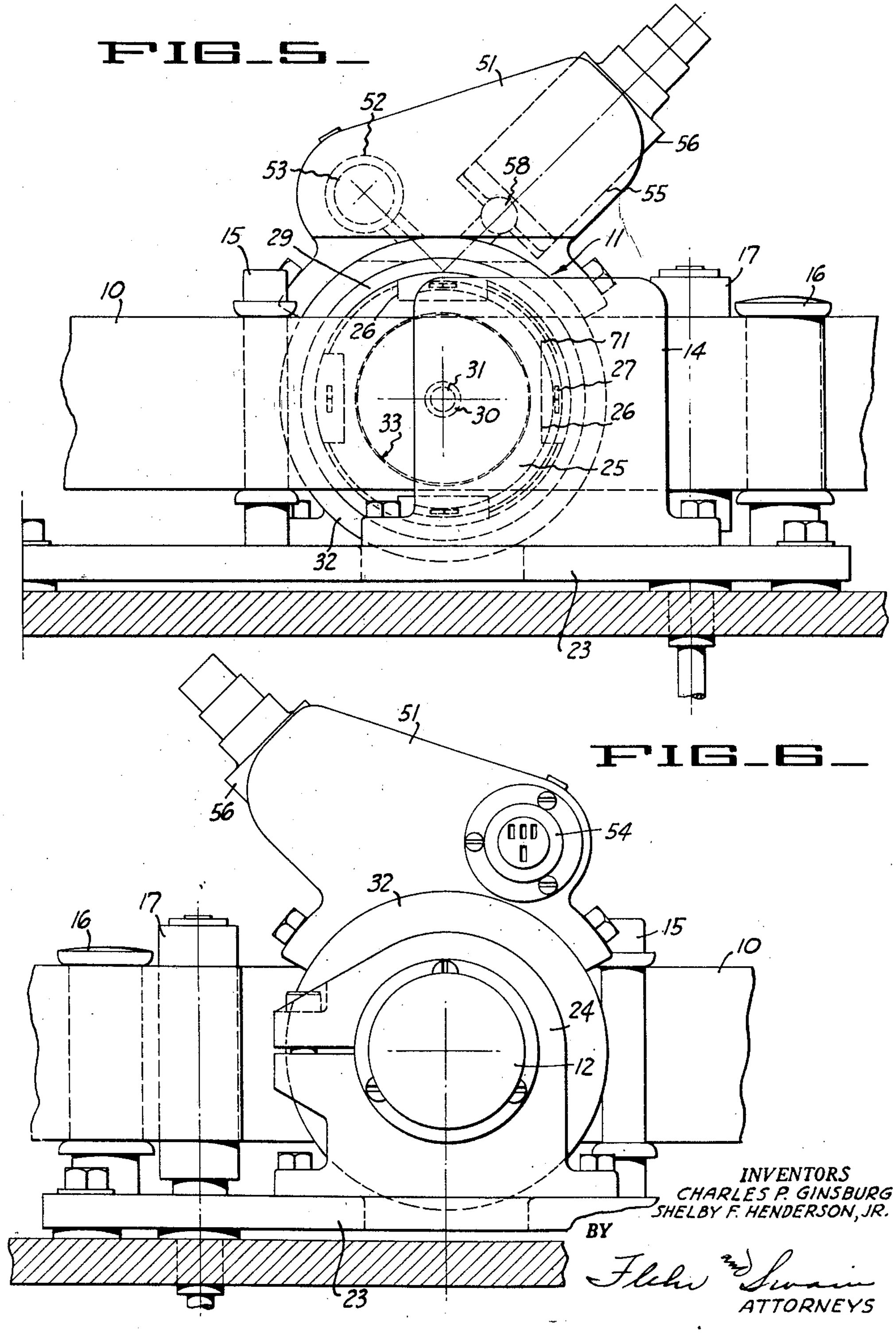
Figure 5 is a front elevational view illustrating the rotary head assembly incorporated in Figure 1.
Figure 6 is a side elevational view of the same assembly shown in Figure 5, but looking toward the rear side of the same.
Figures 7, 8:
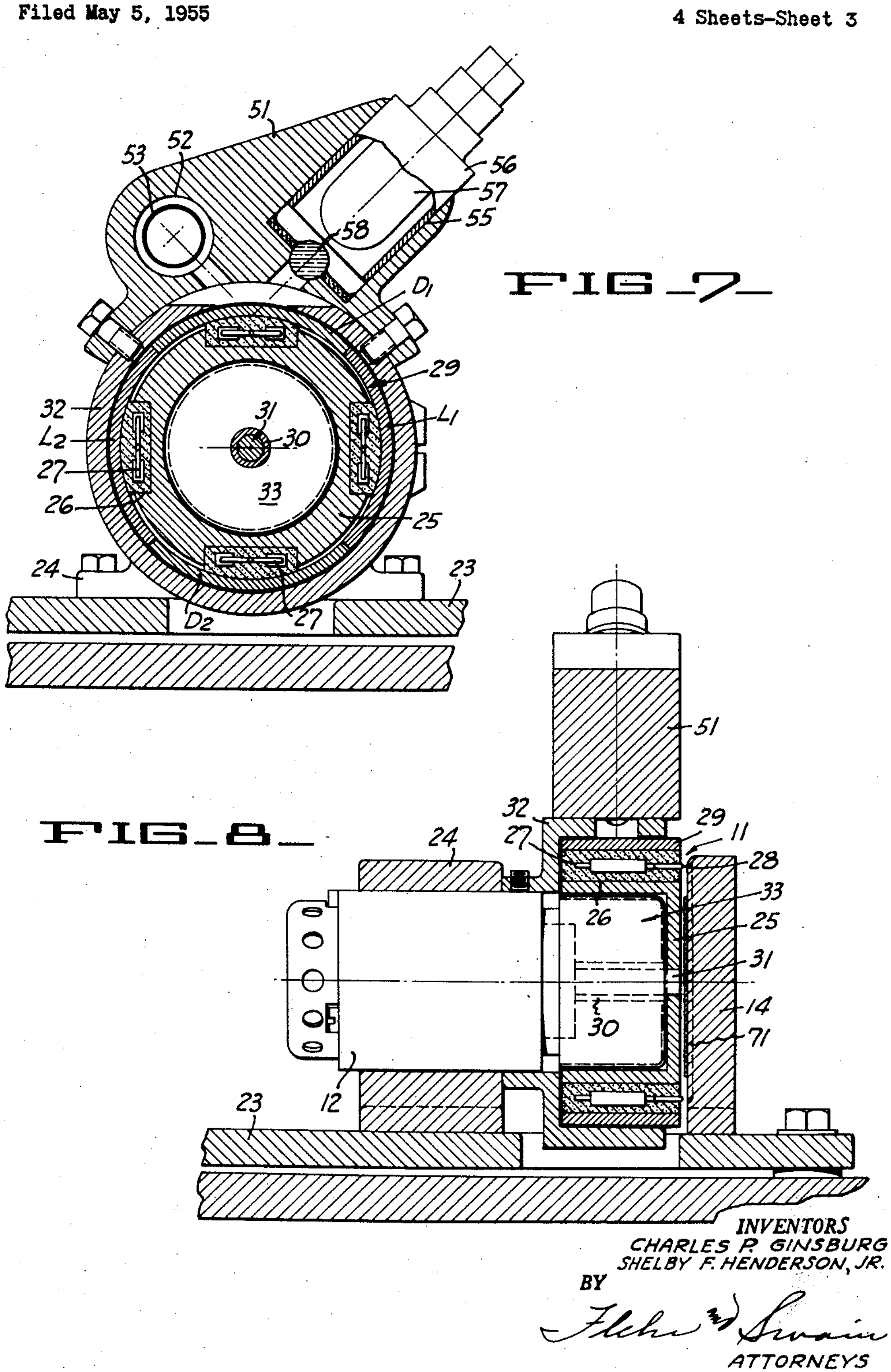
Figure 7 is a side elevational view in section showing a portion of the rotary head assembly and particularly the pulse generating means.
Figure 8 is a cross-sectional view taken along the line 8—8 of Figure 7.

The arrangement just described is schematically illustrated in Figure 3. The photoelectric tube 53 has its one element grounded, and its other element connected to the control grid of the cathode follower tube 61, through the coupling condenser 62. The cathode of tube 61 is connected to ground through the series resistors 63 and 64. The control grid is also connected to the point of connection between the last named resistors, by grid leak resistor 65. Output lead 7 connects to the cathode, and can be shielded as illustrated. It will be evident that the tube 61 functions as a cathode follower to supply pulse to the further amplifying means to be presently described.

Figure 11:
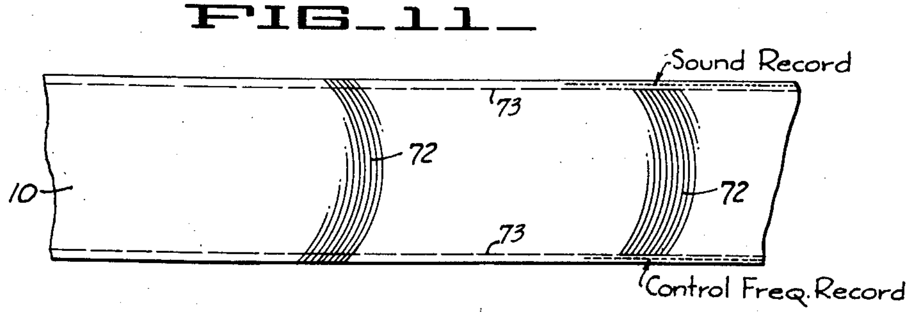
Figure 11 illustrates a portion of the magnetic tape with record tracks thereon.
Figure 10:
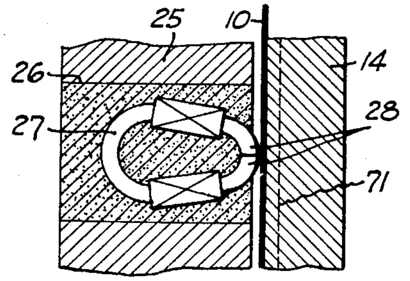
Figure 10 is a detail in section illustrating one of the magnetic units in contact with the magnetic tape.

Figure 11 illustrates a portion of the magnetic tape with indicated sweep areas 72 upon the same. The areas 72 represent the tracks swept by the tips of the magnetic head units, and these areas are spaced apart in the direction of the length of the tape. The dotted lines 73 represent the demarcation between the tracks which carry picture intelligence, and the marginal edge portions over which erase heads have operated.

As shown in said copending application Serial No. 427,138, in a recording operation video signal frequencies are applied to the leads 5 and 6 from suitable electronic means. During reproduction the leads 5 and 6 connect to the input of a suitable electronic system for the purpose of reproducing a visual image. The reproducing system may include switching means for performing switching operations while two head units are operating within lines 73. In other words, switching is performed when one head is near the lower line 73 and the next head is just below the upper line 73. Such switching operations serve to sequentially connect the leads for reproducing the recorded video signal frequencies. One marginal edge of the tape can be used for the recording of audio frequencies or other information, and the other margin for recording control frequencies, as previously mentioned. In both instances, an erasing operation is carried on prior to making the desired marginal recording.

To complete the description of the system illustrated in Figure 1, the amplifier 76, which is the cathode follower shown in Figure 3, has its output connected to the frequency divider 77. This frequency divider serves to reduce the frequency of the pulses from amplifier 76 to a frequency convenient for operation of the motor 18. For example, the output of amplifier 76 may normally be 480 c.p.s., and the frequency divider output of the frequency divider 77 to provide an output frequency of 60 c.p.s. The output of the frequency divider 77 is adapted to be connected by switch S1 with the input of the power amplifier 78. The output of this amplifier supplies the motor 18. The output of the frequency divider 77 is also applied to the amplifier 79, which is connected through switch S2 with the record head 22. The input of power amplifier 13, which supplies the motor 12, is connected with a source of alternating current supply, such as a standard reference oscillator operating on a frequency of 240 c.p.s.

The switches S1 and S2 in Figure 1 are positioned for a recording operation. The motor 12 drives the rotary head at a substantially constant speed determined by the frequency of source 81. The tape is drawn across the platen 14 at a speed determined by the speed of rotation of the capstan motor 18. The photoelectric means associated with the head generates a square wave at a frequency determined by the rate of rotation of the head, and this frequency is applied to the divider 77, to provide a frequency of, say, 60 c.p.s. which is applied to the power amplifier 78 and the amplifier 79. Thus the motor 18 which receives alternating current from the amplifier 78, is driven at a speed determined by the frequency applied to the divider 77, or in other words, by the speed of rotation of the head. The frequency with which the motor 18 is driven is likewise supplied to the recording head 22, thus providing a record of this frequency along one margin of the tape.

For a reproducing operation switch S1 is shifted to connect the output of the divider to the amplifier and limiter 82, which in turn connects to the phase comparator 83. Switch S2 is shifted to connect the head 22 to the input of the amplifier 84. The output of this amplifier is applied to the amplifier and limiter 86 which also connects to the phase comparator 83.

Switch S3 when closed connects the input of amplifier 78 with the output of amplifier 87. The phase comparator 83 is adapted to apply a correcting voltage through the low pass filter 88 to the variable reactor 89. This reactor controls the variable oscillator 90 which in turn connects with the input of the amplifier 87.

Figure 2:
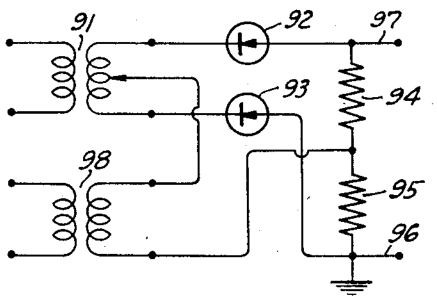
Figure 2 is a circuit diagram illustrating a suitable phase comparator for use in the system of Figure 1.

The electronic system described above utilizes certain of the features disclosed and claimed in the above mentioned copending application Serial No. 321,456, now Patent No. 2,797,263, issued June 25, 1957. The phase comparator 83 is preferably of the electronic type and can be constructed as shown in Figure 2. A transformer 91 has its secondary connected to the cathodes of the diodes 92 and 93. The diodes have their anodes connected across the load resistors 94 and 95, which connect from the grounded conductor 96 to the output conductor 97. A second transformer 98 has one terminal of its secondary connected to a center tap on the secondary of transformer 91. The other secondary terminal of transformer 98 connects to the point of connection between resistors 94 and 95.

Operation of the phase comparator shown in Figure 2 is as follows: The reference frequency is applied to the primary of transformer 91. The voltage developed across each half of the secondary of transformer 91 either adds to or subtracts from the secondary voltage of transformer 98, depending upon the instantaneous polarity relationship of the two signals. The average current of each of the diodes 92 and 93 depends upon the length of time during each cycle that their applied voltages are additive or subtractive polarity. This in turn is dependent upon the phase angle between the two applied waves. When the phase angle is 90° or 270°, the average currents through the diodes are equal, and the equal voltages of opposite polarity are developed across the load resistors 94 and 95. Hence the net voltage between conductor 97 and ground will be zero. If the phase angle departs from 90° or 270°, the average diode currents will become unbalanced, and the net output voltage between conductors 97 and 96 will no longer be zero. The output voltage polarity will depend upon whether the phase angle is leading or lagging the 90° or 270° relation, the magnitude will be proportionate to the amount of lead or lag. Assuming that both applied frequencies are of substantially square wave form, a linear relation between output voltage and phase angle is obtained over a range of 90°. Since the currents through the diodes are in the form of pulses, it is desirable to provide the low pass filter 88 between the phase detector output and the variable reactance 89 so that only a direct current voltage proportional to the average current is applied to the variable reactor.

Overall operation of the system shown in Figure 1 is as follows: The apparatus is first operated in the manner previously described, with recording of video signals upon the tape, and with the switches S1, S2 and S3 positioned as shown in Figure 1. A submultiple of the frequency generated by the photoelectric means is continuously recorded on one margin of the tape, and is applied to the amplifier 78 to provide alternating current for energizing the capstan motor 18. During such recording operations there may be some slight deviations in the speed of operation of the rotary head, due for example, to slight variations in the mechanical load on the rotating head.

For reproduction the tape is run through the machine a second time and the positioning of the switches S1, S2 and S3 is shifted, whereby the frequency divider 77 now has its output connected to phase comparator 83, head 22 directly connected through switch S2 to the amplifier 84, and the input of the amplifier 78 supplied from the output of amplifier 87. Assuming that the head is being driven at a speed in exact synchronism with the recorded tracts, the variable oscillator 90 applies a frequency to the amplifier 87, of, for example, 60 c.p.s., whereby motor 18 is excited by current of this frequency. Assuming that some lack of synchronism occurs, a difference in phase relationship occurs between the frequencies applied by the divider 77 and limiter 82, and the limiter 86, with the result that a correcting voltage is developed at the output of the phase comparator, and this correcting voltage is applied to the variable reactor 89, through the low pass filter 88.

The variable reactor and the variable oscillator 90, can be one apparatus making use of a vacuum tube reactance controlled by the output from the phase comparator. Variations in reactance serve to vary the frequency of operation of the oscillator. Thus a change in voltage from the output of the phase comparator is applied in such a manner as to effect a corresponding change in the frequency of operation of the oscillator 90, and such a change in operating frequency of the oscillator results in a change in frequency of excitation of the motor 18.

It will be evident that the system described above makes possible highly accurate reproduction of recorded video frequencies. It compensates for and obtains reproduction independently of such factors as tape stretch or shrinkages due to mechanical stresses or variations in temperature or humidity, mechanical slippage of the tape with respect to the driving mechanism, or variations in frequency which may occur from time to time in source 81 for driving the motor 12 during recording or playback.

It will be evident that the system and apparatus can be modified in many respects without departing from the invention. For example, a rotary head can be driven by motor 12 through a suitable drive mechanism, such as belt and pulleys, instead of being directly connected. Instead of directly recording pulses upon the tape from the output of the amplifier 79, such pulses can be used to modulate a carrier wave, and the modulated carrier in turn recorded. In such event demodulating means is required to demodulate the reproduced signal from the head 22, thereby to develop pulses suitable for application to the amplifier 84.

With respect to the construction of the rotary head, it will be evident that the invention is applicable to a variety of assemblies which utilize a motor for causing magnetic units to sweep across the magnetic tape, as distinguished from simple magnetic head assemblies of the stationary type used with ordinary magnetic tape equipment.

We claim:

1. In a system of the character described, a rotary head assembly including transducer means, means for rotating the head assembly, tape transport means for moving a magnetic tape in cooperative relation with the head assembly whereby the transducer means sweeps across successive tracks extending from one edge of the tape to the other, means including an alternating current motor for driving the tape, pulse generating means associated with the head assembly and serving to generate pulses of a frequency dependent upon the speed of rotation of the head assembly, means for supplying alternating current to said motor at a frequency directly dependent upon the frequency of said pulse generating means, and means for recording on the tape a control frequency dependent upon the frequency of the pulse generating means.

2. In apparatus of the character described, a rotary head assembly, means serving to carry a magnetic tape for cooperative movement past the head assembly, said tape having signal record track portions extending across the tape from one edge thereof to the other and spaced in the direction of the length of the tape, said tape also having a control frequency track recorded thereon and extending longitudinally of the tape, said head assembly including transducer means adapted to successively sweep across the tape from one edge thereof to the other when the head assembly is rotated, a first alternating current motor of the synchronous type connected to drive the head assembly, means including a second alternating current motor of the synchronous type connected to independently drive the tape, pulse generating means directly associated with the head and serving to generate a frequency directly dependent upon the rate of rotation of the head, a phase comparator adapted to have two frequencies applied to the same and providing a correcting voltage dependent upon the phase relationship between said applied frequencies, means serving to apply a frequency to the phase comparator directly dependent upon the frequency of the pulse generating means, means for reproducing the control frequency, means serving to apply a second frequency to the phase comparator directly dependent upon said reproduced control frequency and means responsive to said correcting voltage serving to supply alternating energizing current to the motor which independently drives the tape, the frequency of which is dependent upon the value of the correcting voltage whereby the tape is driven at a speed such that said transducer means tracks upon the recorded track areas.

3. In a system of the character described, a rotatable head assembly including a plurality of transducer units, means for rotating the head assembly tape transport means for moving a magnetic tape in cooperative relation with the head assembly whereby the units sweep successively and laterally across the tape, means including an alternating current motor for driving the tape, pulse generating means associated with the head assembly and serving to generate pulses of a frequency dependent upon the speed of rotation of the head assembly, means for supplying alternating current to said motor at a frequency directly dependent upon the frequency of said pulse generating means, and means for recording on the tape a control frequency dependent upon the frequency of the pulse generating means.

4. In apparatus of the character described, a rotary head assembly including a plurality of transducer units, means serving to carry a magnetic tape for movement relative to the head assembly, whereby upon rotation of the head assembly, said units are caused to successively sweep laterally across the magnetic tape, a first alternating current motor of the synchronous type connected to drive the head assembly, means including a second alternating current motor of the synchronous type for independently driving the tape, pulse generating means directly connected to the head assembly and serving to generate pulses having a frequency dependent upon the speed of rotation of the head, frequency dividing means connected to the pulse generating means and providing a lower output frequency directly dependent upon the frequency of the pulse generating means, a recording head engaging one margin of the tape, and means connected to the frequency divider and serving to apply current having a frequency corresponding to that of the frequency divider output to the second motor and also serving to apply the same frequency to the recording head.

5. In apparatus of the character described, a rotary head assembly, means serving to carry a magnetic tape for cooperative movement past the head assembly, said tape having signal record track portions extending laterally of the tape and spaced in the direction of the length thereof, said tape also having a control frequency track recorded thereon and extending longitudinally of the tape, said head assembly including a plurality of transducer units adapted to successively sweep laterally across the tape when the head assembly is rotated, a first alternating current motor of the synchronous type connected to drive the head assembly, means including a second alternating current motor of the synchronous type connected to independently drive the tape, pulse generating means directly associated with the head and serving to generate a frequency directly dependent upon the rate of rotation of the head, a phase comparator adapted to have two frequencies applied to the same and providing a correcting voltage dependent upon the phase relationship between said applied frequencies, means serving to apply a frequency to the phase comparator directly dependent upon the frequency of the pulse generating means, means for reproducing the control frequency, means serving to apply a second frequency to the phase comparator directly dependent upon said reproduced control frequency, and means responsive to said correcting voltage serving to supply alternating energizing current to the motor which independently drives the tape, the frequency of which is dependent upon the value of the correcting voltage, whereby the tape is driven at a speed such that said units track up on the laterally recorded areas.

6. Apparatus as in claim 5 in which circuit means serves to apply signal frequencies over a broad band to the units of the rotary head and in which the control frequency is recorded on one margin of the tape.

References Cited in the file of this patent

UNITED STATES PATENTS

| | | |
|---|---|---|
| 1,857,451 | Hansen | May 10, 1932 |
| 1,916,510 | Hansen | July 4, 1933 |
| 2,124,415 | Green | July 19, 1938 |
| 2,245,286 | Marzocchi | June 10, 1941 |
| 2,652,554 | Williams | Sept. 15, 1953 |
| 2,774,927 | Evans | Dec. 18, 1956 |
| 2,797,378 | Johnson | June 25, 1957 |

FOREIGN PATENTS

| | | |
|---|---|---|
| 720,334 | Great Britain | Dec. 15, 1954 |